US008008800B2

(12) United States Patent
Mackin et al.

(10) Patent No.: US 8,008,800 B2
(45) Date of Patent: Aug. 30, 2011

(54) HARVESTER MULTIPLE ENGINE ENERGY CONTROL SYSTEM

(75) Inventors: Ryan P. Mackin, Milan, IL (US); Alan D. Sheidler, Moline, IL (US)

(73) Assignee: Deere & Company, Moline, IL (US)

( * ) Notice: Subject to any disclaimer, the term of this patent is extended or adjusted under 35 U.S.C. 154(b) by 64 days.

(21) Appl. No.: 12/470,774

(22) Filed: May 22, 2009

(65) Prior Publication Data

US 2010/0295368 A1 Nov. 25, 2010

(51) Int. Cl.
*B60L 1/00* (2006.01)
*B60L 3/00* (2006.01)
*H02G 3/00* (2006.01)

(52) U.S. Cl. ............ 307/9.1; 307/10.1; 307/25; 307/84; 60/698; 477/3; 460/119; 701/50; 56/10.7; 180/53.5; 180/900

(58) Field of Classification Search ................... None
See application file for complete search history.

(56) References Cited

U.S. PATENT DOCUMENTS

| 4,662,472 | A * | 5/1987 | Christianson et al. ........ 180/235 |
| 6,066,897 | A * | 5/2000 | Nakamura ..................... 290/4 A |
| 7,701,077 | B2 * | 4/2010 | Brown et al. .................. 307/9.1 |
| 2004/0160122 | A1 * | 8/2004 | Yokoyama et al. ............. 307/9.1 |
| 2005/0035657 | A1 * | 2/2005 | Brummett et al. ............ 307/10.1 |
| 2005/0079949 | A1 * | 4/2005 | Suzuki ............................. 477/2 |
| 2006/0003864 | A1 * | 1/2006 | Stummer ........................... 477/2 |
| 2006/0085117 | A1 * | 4/2006 | Stummer ......................... 701/50 |
| 2007/0130950 | A1 | 6/2007 | Serkh et al. |
| 2007/0138982 | A1 * | 6/2007 | Guggisberg et al. ........... 318/140 |
| 2008/0076622 | A1 * | 3/2008 | Manken et al. ...................... 477/3 |
| 2009/0233664 | A1 | 9/2009 | Sheidler et al. |
| 2009/0233759 | A1 | 9/2009 | Sheidler et al. |
| 2009/0308036 | A1 | 12/2009 | Sheidler |

FOREIGN PATENT DOCUMENTS

DE 9413639 * 12/1995
JP 2001320805 A 11/2001

OTHER PUBLICATIONS

European Search Report dated Aug. 23, 2010. (4 pages).

* cited by examiner

*Primary Examiner* — Rexford Barnie
*Assistant Examiner* — Justen Fauth

(57) ABSTRACT

An agricultural vehicle including a plurality of engines, a plurality of loads, a plurality of electrical generators, at least one load sensor, at least one electrical energy storage device, and a controller. The plurality of engines include a first engine and a second engine. The plurality of loads include a first mechanical load, a second mechanical load, a first electrical load, and a second electrical load. The first mechanical load is coupled to the first engine and the second mechanical load is coupled to the second engine. The plurality of electrical generators include a first generator and a second generator. The first generator is coupled to the first engine and the second generator is coupled to the second engine. The first generator is electrically coupled to the first electrical load and the second generator is electrically coupled to the second electrical load. The at least one load sensor is configured to produce a signal representative of power being used by the first engine and the second engine to drive the plurality of loads. The controller is configured to direct energy from the electrical energy storage device to the plurality of loads and/or the plurality of electrical generators dependent upon the signal.

20 Claims, 2 Drawing Sheets

HARVESTER MULTIPLE ENGINE ENERGY CONTROL SYSTEM

BACKGROUND OF THE INVENTION

1. Field of the Invention

The present invention relates to work machines, and, more particularly, to energy control systems for multiple engine driven harvesters.

2. Description of the Related Art

A work machine, such as an agricultural machine in the form of a harvester, typically includes a prime mover in the form of an internal combustion (IC) engine. The IC engine may either be in the form of an compression ignition engine such as a diesel engine, or a spark ignition engine, such as a gasoline engine. For most heavy work machines, the prime mover is in the form of a diesel engine having better lugging, pull down, and torque characteristics for work operations than the gasoline engine.

An IC engine in a harvester provides input power to a transmission, which in turn is coupled with the rear axles through a rear end differential. The transmission, rear end differential, and rear axles are sometimes referred to as the power train of the work machine.

It is known to provide multiple engines on a harvester with electrical generators and various electrical motors. IC engines and electric motors are used to drive hybrid vehicles, and it is known to use regeneration techniques such that the generator/electric motor generates electrical power when the vehicle is executing a braking maneuver. Dual engines or even an engine having a dual crankshaft system is used to power vehicles having a transmission coupled thereto for transferring the driving torque of at least one of the engine or crankshafts to the motor/generator of the vehicle. The dual engine system utilizes both engines when additional load levels are required, such as during acceleration, climbing a hill, or pulling a heavy load. It is also known to utilize an electric motor to assist in providing the torque when additional increased loads are applied to the IC engine.

What is needed in the art is a control system for the effective efficient control of energy in a multiple engine harvester.

SUMMARY OF THE INVENTION

The invention in one form is directed to an agricultural vehicle and includes a plurality of engines, a plurality of loads, a plurality of electrical generators, at least one load sensor, at least one electrical energy storage device, and a controller. The plurality of engines include a first engine and a second engine. The plurality of loads include a first mechanical load, a second mechanical load, a first electrical load, and a second electrical load. The first mechanical load is coupled to the first engine and the second mechanical load is coupled to the second engine. The plurality of electrical generators include a first generator and a second generator. The first generator is coupled to the first engine and the second generator is coupled to the second engine. The first generator is electrically coupled to the first electrical load and the second generator is electrically coupled to the second electrical load. The at least one load sensor is configured to produce a signal representative of power being used by the first engine and the second engine to drive the plurality of loads. The controller is configured to direct energy from the electrical energy storage device to the plurality of loads and/or the plurality of electrical generators dependent upon the signal.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention and such exemplifications are not to be construed as limiting the scope of the invention in any manner.

DETAILED DESCRIPTION OF THE INVENTION

Figure 1:
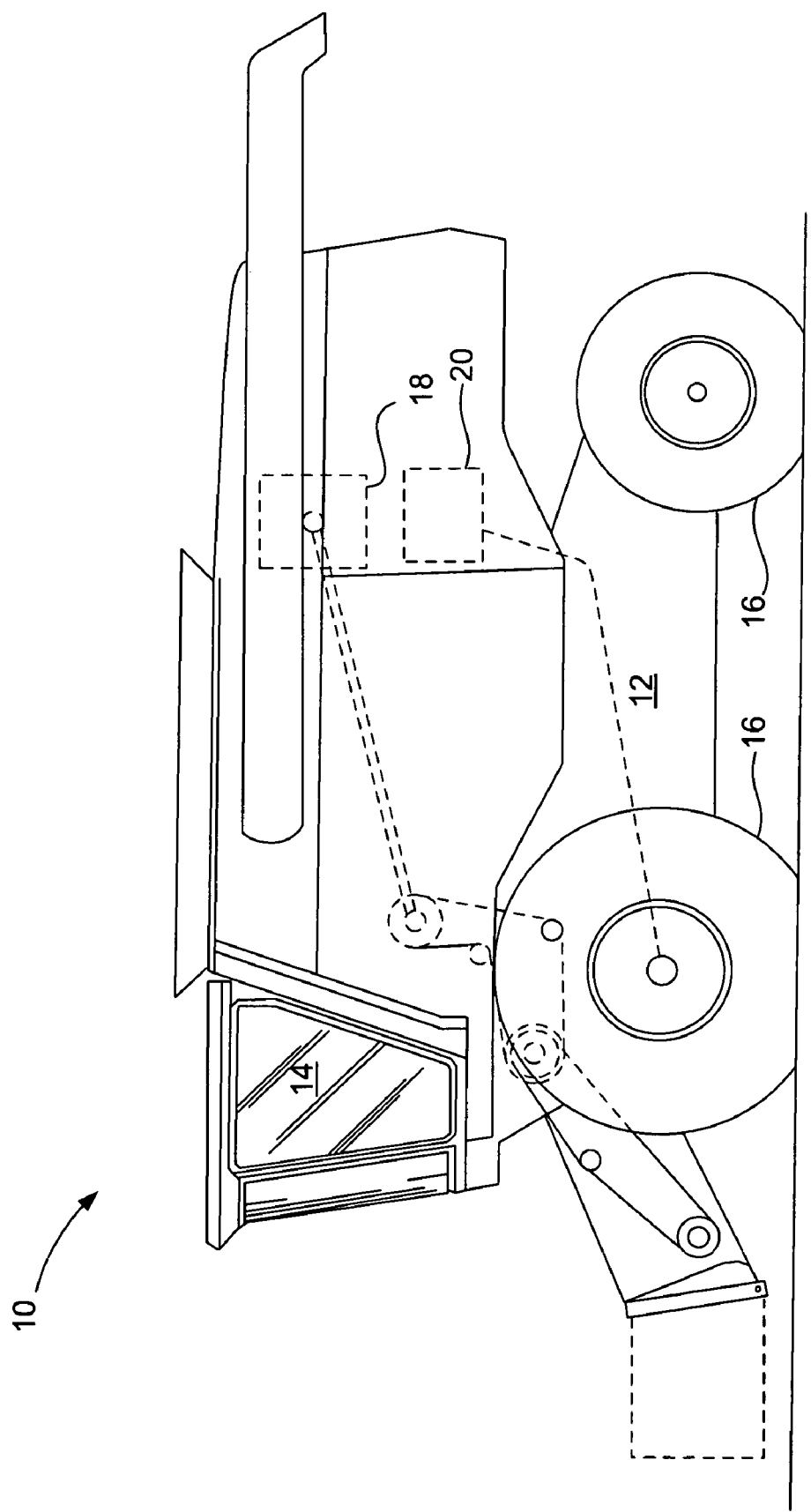
FIG. 1 is a side view of a harvester utilizing an embodiment of the energy control system of the present invention.

Referring now to the drawings, and more particularly to FIG. 1, there is shown an agricultural vehicle 10, also more particularly illustrated as a harvester 10, which includes a chassis 12, cabin/controls 14, wheel 16, a power system 18, and a power system 20. Harvester 10 has a variety of mechanical and electrical systems therein including a crop-gathering header that directs crop material to a threshing section. The threshing section separates the grain from other crop material and directs the grain to a sieve area for further separation of the grain from the lightweight crop material. The grain is then conveyed to a storage area for later conveyance to a grain transport vehicle.

Chassis 12 provides structural integrity for harvester 10 and is used to support mechanical and electrical systems therein. Controls in cabin 14 allow an operator the ability to direct the functions of harvester 10. Wheels 16 support chassis 12 and allow a propulsion system to move harvester 10 as directed by the operator using controls in cabin 14. Power systems 18 and 20 are configured to have separate loads, for example, one of the power systems may provide power for the propulsion system and the other provide power to the threshing section of harvester 10. Although illustrated as separate power systems, mechanical and electrical coupling of the loads is also contemplated.

Figure 2:
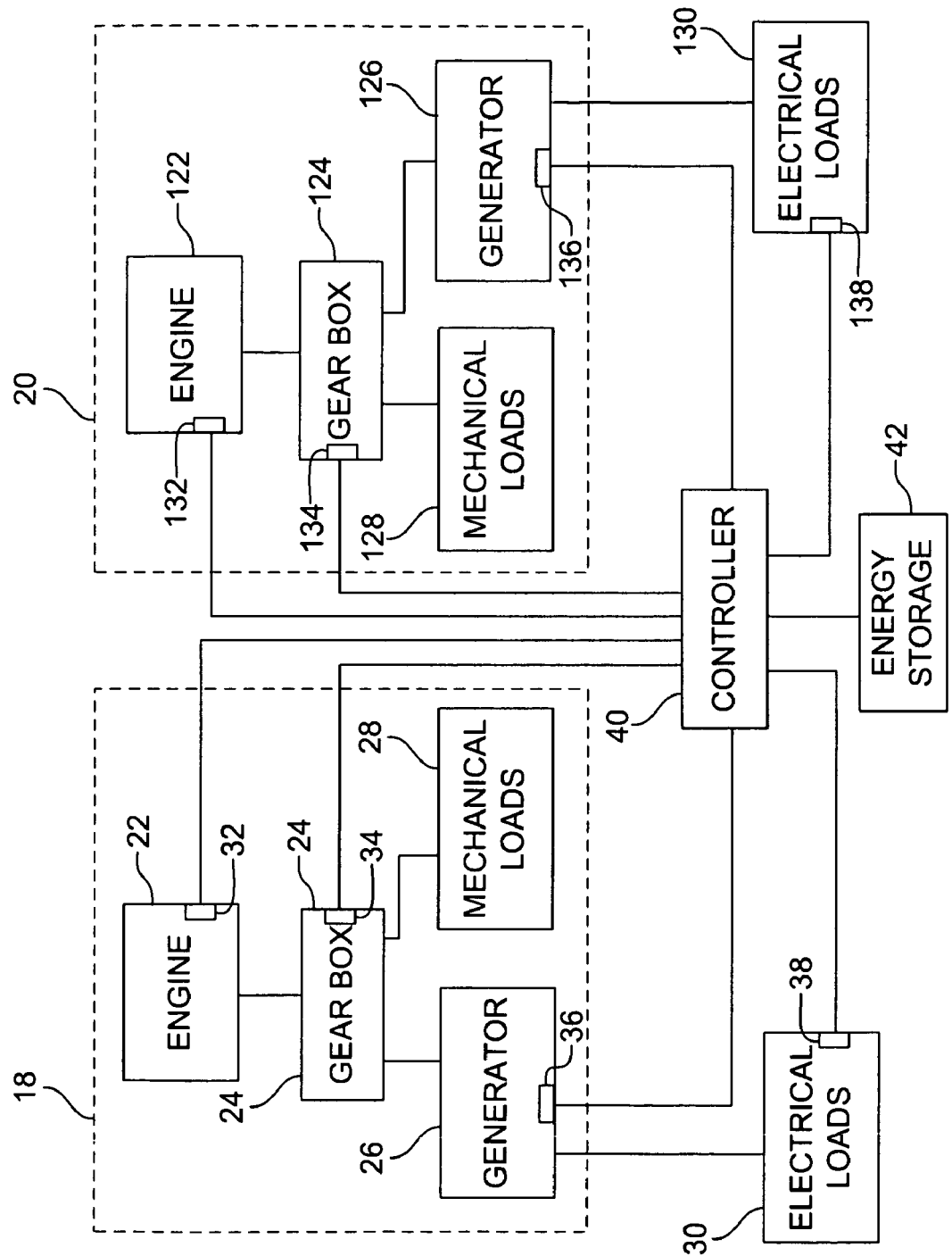
FIG. 2 is a schematical block diagram representing the multiple engine energy control system of FIG. 1.

Now, additionally referring to FIG. 2, there is shown schematically an illustration of an embodiment of the multiple engine energy control systems utilized by power systems 18 and 20. The elements of power system 18 include an engine 22, a gear box/transmission 24, a generator 26, mechanical loads 28, electrical loads 30, an engine sensor/control 32, a gear box sensor/control 34, a generator sensor/control 36, and an electrical load sensor/control 38. Elements of power system 20, although separate and perhaps different, are referred to with numbers that have 100 added to the similar functional elements of power system 18.

Controller 40 is interconnected to many portions of power systems 18 and 20 to provide interactive control so that elements of systems 18 and 20 can be interlinked to some extent so that harvester 10 can carry out its intended missions. Energy storage device 42 is selectively coupled to power systems 18 and 20 under the direction of controller 40 to thereby provide energy when the power required by the loads associated with power systems 18 and 20 exceed predetermined levels or rates of changes such that energy from energy storage device 42 can be used to supplement and drive some of the loads associated with power systems 18 and 20.

Controller 40 has been illustrated as a stand alone controller for the sake of clarity and the explanation of the invention; however, it is also understood that the functions of controller 40 can be undertaken by a controller utilized for other functions in harvester 10. Although the interlinking between controller 40 and other elements are shown as a single line, these lines are intended to convey the understanding that information, control signals, and/or power may be routed therebetween.

Engine 22 is an internal combustion engine 22 that is connected to gear box 24. Gear box 24 mechanically drives generator 26 as well as mechanical loads 28. The description of mechanical loads 28 is not to infer that there is not a mechanical linkage between generator 26 and gear box 24, but rather signifies that there is an additional mechanical load that is assigned to power system 18 as well as separate mechanical loads being assigned to power system 20. For example, mechanical loads 28 may include a grain separation mechanism within harvester 10, while mechanical loads 128 may be the propulsion and hydraulic systems of harvester 10. The loads are advantageously divided so that in the event harvester 10 is simply traveling from one field to another without the threshing system working that perhaps engine 22 may be shut off while engine 122 provides the motive power for movement of harvester 10.

Generator 26 additionally functions as an electrical motor 26 when it is driven by electrical power supplied thereto from electrical storage device 42 under the direction of controller 40. For example, engine 22 may be loaded down with significant electrical loads 30 so that electrical energy may be conveyed from energy storage device 42 directly to electrical loads 30 to thereby reduce the overall load on engine 22. It is to be understood that although electrical storage device 42 may be in the form of a battery 42 that power converters and inverters may be utilized, which are not shown, to alter the voltage and current supplied to various portions of power systems 18 and 20.

In the event that either or both power systems 18 and 20 are experiencing a higher than normal load, as sensed by controller 40, the detection of which may be in the form of signal sent from sensors 32 and 132, the shifting or reassignment of the load is accomplished by providing energy from energy storage device 42 to electrical loads 30, 130, or mechanical loads 28 and 128 by back driving generators 26 and 126 respectively. For example, if power system 18 has encountered an additional load, such as a slug going through the threshing system thereby placing a heavier mechanical load 28 on engine 22, then controller 40 can supply electrical energy from electrical energy storage device 42 to supply some or all of the electrical load needs 30, thereby reducing the load on engine 22 that is required to drive generator 26, freeing the additional power to drive mechanical loads 28 so that the slug can be effectively dealt with.

In this manner, controller 40 balances loads of power systems 18 and 20 along with the energy output of energy storage device 42 so that engines 22 and 122 can operate close to their most efficient performance rpm. The shifting of electrical loads is undertaken by electrically disconnecting a load from one generator or the other or both, and electrically connecting them to receive power from energy storage device 42 so that loads can be directly driven, reducing the loads on power systems 18 and 20. Shifting of electrical loads can also include the shifting from one generator to the other in combination with supplying power from electrical energy storage device 42. Also, as previously mentioned, power can be supplied to gear boxes 24 and 124 by back driving generators 26 and/or generator 126 which function as motor/generators. Further, energy from energy storage device 42 can be simply supplied to generators 26 and 126 to supplement the outputs thereof.

The balancing of loads between power systems 18, 20 and energy storage device 42 is undertaken by controller 40, which additionally keeps track of physical attributes of power system 18, power system 20, and energy storage device 42. For example, engine 22 may be smaller than engine 122 or may have a different torque power curve so that different attributes of power systems 18 and 20 as well as the capacity of energy storage device 42 and its current electrically stored energy are part of the controlling algorithm of controller 40 so as to optimize the overall functioning of harvester 10. In this manner, the balancing of a load does not intend to infer that loads are somehow split evenly between power system 18, power system 20, and some supplemental portion from energy storage device 42, but, rather, are controlled by controller 40 for optimum performance of each power system and in light of the energy stored in energy storage device 42.

Harvester 10 having engines 22 and 122 each driving generators 26 and 126 respectively are coupled to drive a plurality of loads by using electricity provided by generators 26 and 126. This eliminates a need for any alternators to be separately placed on engines 22 and 122 and the size of energy storage device 42 is more than sufficient to provide starting power to start engines 22 and 122. It is understood that electrical energy storage device 42 is significantly larger than a typical battery utilized for the initial starting of an engine.

The advantages of the present invention include providing the controller the flexibility to direct energy to one or both power systems that may be under stress and allowing energy storage device 42 to be charged from generators 26 and/or 126 when power system 18 and/or 20 are not experiencing significant loads. Inverter/power converters are utilized to convert electricity from energy storage device 42 and generators 26 and 126 into the proper voltages necessary for the operation of various electrical loads and charging systems. This provides for higher efficiency in that the electronic systems that are a part of harvester 10 are then subject to a more stable, regulated power source. This leads to high reliability of the overall system.

Harvester 10 has a plurality of engines, each engine 22 or 122 is coupled to multiple loads and a generator. Electronic controller 40 is coupled to energy storage device 42 and to generators 26 and 126 to selectively provide power to the loads associated with engines 22 and 122. Controller 40 is additionally configured to charge energy storage device 42 from either or both generators 26 or 126. Energy storage device 42 can provide power to any load by way of controller 40.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle, comprising:
a plurality of engines including a first engine and a second engine;
a plurality of loads including a first mechanical load, a second mechanical load, a first electrical load and a second electrical load, said first mechanical load being coupled to said first engine, said second mechanical load being coupled to said second engine;
a plurality of electrical generators including a first generator and a second generator, said first generator being coupled to said first engine, said second generator being coupled to said second engine, said first generator being electrically coupled to said first electrical load, said second generator being electrically coupled to said second electrical load;

at least one load sensor configured to produce a signal representative of power being used by said first engine and said second engine to drive said plurality of loads;

at least one electrical energy storage device; and a controller configured to direct energy from said at least one electrical energy storage device to at least one of said plurality of loads and said plurality of electrical generators dependent upon said signal, said controller being further configured to direct energy to back drive at least one of said first generator and said second generator dependent upon said signal.

2. The agricultural vehicle of claim 1, wherein said first mechanical load together with said first electrical load represent a first total load, said second mechanical load together with said second electrical load represent a second total load, said at least one load sensor includes a plurality of load sensors including a first load sensor and a second load sensor, said first load sensor being associated with said first engine and said second load sensor being associated with said second engine, said first load sensor producing a first signal representative of said first total load on said first engine, said second load sensor producing a second signal representative of said second total load on said second engine, said controller being configured to reduce at least one of said first total load and said second total load by directing energy from said at least one electrical energy storage device to meet at least a portion of at least one of said first total load and said second total load.

3. The agricultural vehicle of claim 2, wherein said first engine has a first performance attribute associated therewith and said second engine has a second performance attribute associated therewith, said controller being additionally configured to alter said first total load and said second total load by directing energy from said at least one of electrical energy storage device to at least one of said plurality of loads and said plurality of electrical generators dependent upon said first performance attribute and said second performance attribute.

4. The agricultural vehicle of claim 2, wherein said controller is additionally configured to direct power from at least one of said first generator and said second generator to said at least one electrical energy storage device.

5. The agricultural vehicle of claim 1, wherein at least one of said first generator and said second generator is configured to act as an electrical motor and is configured to receive electrical energy from said at least one electrical energy storage device to thereby assist in the driving of said plurality of loads.

6. The agricultural vehicle of claim 1, wherein said controller is further configured to reduce both said first total load and said second total load by directing energy from said at least one electrical energy storage device to meet at least a portion of both said first total load and said second total load.

7. The agricultural vehicle of claim 1, wherein at least some of said plurality of loads are a plurality of electrical loads, said second generator being configured to additionally function as an electrical motor, said controller being further configured to remove all of said electrical loads from said second generator and to direct electrical energy from said electrical energy storage device to said second generator to assist said second engine meet a demand of said second total load.

8. The agricultural vehicle of claim 7, wherein said controller is further configured to connect at least some of said electrical loads removed from said second generator to said first generator.

9. The agricultural vehicle of claim 7, further comprising:

a first gear box coupled to said first engine, said first gear box serving to couple said first generator and said first mechanical load to said first engine; and a second gear box coupled to said second engine, said second gear box serving to couple said second generator and said second mechanical load to said second engine.

10. The agricultural vehicle of claim 1, wherein the agricultural vehicle is a harvester.

11. A method of controlling load distribution in an agricultural vehicle, the method comprising the steps of:

driving a plurality of loads including a first load coupled to a first engine and a second load coupled to a second engine, said first load including a first generator coupled to said first engine, said second load including a second generator coupled to said second engine;

generating a signal by a load sensor representative of at least one of said first load on said first engine, said second load on said second engine;

directing energy from an electrical energy storage device to at least one of said first load, said second load, said first generator and said second generator dependent upon said signal; and back driving at least one of said first generator and said second generator dependent upon said signal.

12. The method of claim 11, wherein said at least one load sensor includes a plurality of load sensors including a first load sensor and a second load sensor, said first load sensor being associated with said first engine and said second load sensor being associated with said second engine, said first load sensor producing a first signal representative of said first load, said second load sensor producing a second signal representative of said second load, said directing step including the step of altering said first load and said second load by shifting at least one electrical load from being electrically coupled to one of said first generator and said second generator to being electrically coupled to said at least one electrical energy storage device dependent upon said first signal and said second signal.

13. The method of claim 12, wherein said first engine has a first performance attribute associated therewith and said second engine has a second performance attribute associated therewith, the method further including the step of altering said first load and said second load by shifting at least one of said electrical loads from being electrically coupled to one of said first generator and said second generator dependent upon said first performance attribute and said second performance attribute.

14. The method of claim 11, further comprising the step of sending a charging current to said electrical energy storage device from at least one of said first generator and said second generator.

15. The method of claim 11, wherein said directing step further includes directing power from said electrical energy storage device to at least one of said first generator and said second generator which are configured to act as electrical motors to thereby assist in the driving of said plurality of loads.

16. The method of claim 12, wherein said directing step further includes the step of reducing both said first load and said second load by directing energy from said at least one electrical energy storage device to meet at least a portion of both said first load and said second load.

17. The method of claim 11, wherein said second generator is configured to additionally function as an electrical motor, the method including the step of removing all of said electrical loads from said second generator, said directing step including directing electrical power from said electrical energy storage device to said second generator to assist said second engine meet a demand of said second load.

18. The method of claim 17, further comprising the step of connecting at least some of said electrical loads removed from said second generator to said first generator.

19. The method of claim 17, wherein a first gear box is coupled to said first engine, said first gear box serving to couple said first generator and a first mechanical load to said first engine, a second gear box being coupled to said second engine, said second gear box serving to couple said second generator and a second mechanical load to said second engine.

20. The method of claim 11, wherein the agricultural vehicle is a harvester.

\* \* \* \* \*